United States Patent [19]

Hilaris

[11] Patent Number: 4,776,769
[45] Date of Patent: Oct. 11, 1988

[54] SYSTEM FOR REMOVING MATERIAL WITH A HIGH VELOCITY JET OF WORKING FLUID

[75] Inventor: John A. Hilaris, Elmhurst, Ill.

[73] Assignee: Hydro-Ergon Corporation, Chicago, Ill.

[21] Appl. No.: 76,157

[22] Filed: Jul. 21, 1987

Related U.S. Application Data

[63] Continuation of Ser. No. 837,277, Mar. 7, 1986, abandoned.

[51] Int. Cl.$^4$ .............................................. F04B 27/00
[52] U.S. Cl. .................................. 417/271; 417/374; 417/401
[58] Field of Search ................. 91/484, 485, 491, 493; 417/271, 273, 339, 343, 374, 375, 401, 568; 277/122, 123, 124

[56] References Cited

U.S. PATENT DOCUMENTS

| 759,828 | 5/1904 | Olney | 417/271 |
|---|---|---|---|
| 1,677,539 | 7/1928 | Wollman | 417/273 X |
| 2,462,931 | 3/1949 | Anderson | 417/374 X |
| 2,888,810 | 6/1959 | Hann | 417/374 X |
| 3,323,461 | 6/1967 | Bennett | 417/339 |
| 3,586,341 | 6/1971 | Whittaker et al. | 277/124 |
| 4,313,714 | 2/1982 | Kubeczka | 417/273 |
| 4,729,720 | 3/1988 | Fujita | 417/271 |

FOREIGN PATENT DOCUMENTS

| 2364132 | 7/1974 | Fed. Rep. of Germany | 277/124 |
|---|---|---|---|
| 43181 | 3/1985 | Japan | 417/273 |
| 848738 | 7/1981 | U.S.S.R. | 91/491 |
| 106807 | 6/1917 | United Kingdom | 417/273 |
| 586066 | 3/1947 | United Kingdom | 417/273 |
| 1487311 | 9/1977 | United Kingdom | 417/273 |

Primary Examiner—Leonard E. Smith
Attorney, Agent, or Firm—Mason, Kolehmainen, Rathburn & Wyss

[57] ABSTRACT

A system for removing material with a high velocity jet of working fluid comprises an ultra-high pressure pump having an odd numbered plurality of composite fluid cylinders disposed radially outwardly of an axis of rotation of an eccentric crank. Each composite cylinder includes an inner low pressure cylinder and an outer high pressure cylinder coaxially aligned therewith and the longitudinal axes of the composite cylinders are spaced equilaterally around the crankshaft axis of rotation in a common radial plane. A low pressure piston is mounted in each low pressure cylinder for reciprocation between inner and outer ends and each low pressure piston is interconnected with the crankshaft eccentric to reciprocate on sequential pressure and exhaust strokes during each revolution of the crankshaft. Each high pressure cylinder includes a high pressure piston interconnected with a respective low pressure piston and adapted to reciprocate therewith. A high pressure valve system is provided for each cylinder including an inlet check valve for introducing working fluid into the high pressure cylinder upon successive exhaust strokes thereof. The valve system further includes an outlet check valve for each high pressure cylinder for expelling working fluid under ultra-high pressure as the high pressure piston moves on a pressure stroke.

21 Claims, 9 Drawing Sheets

FIG_3A

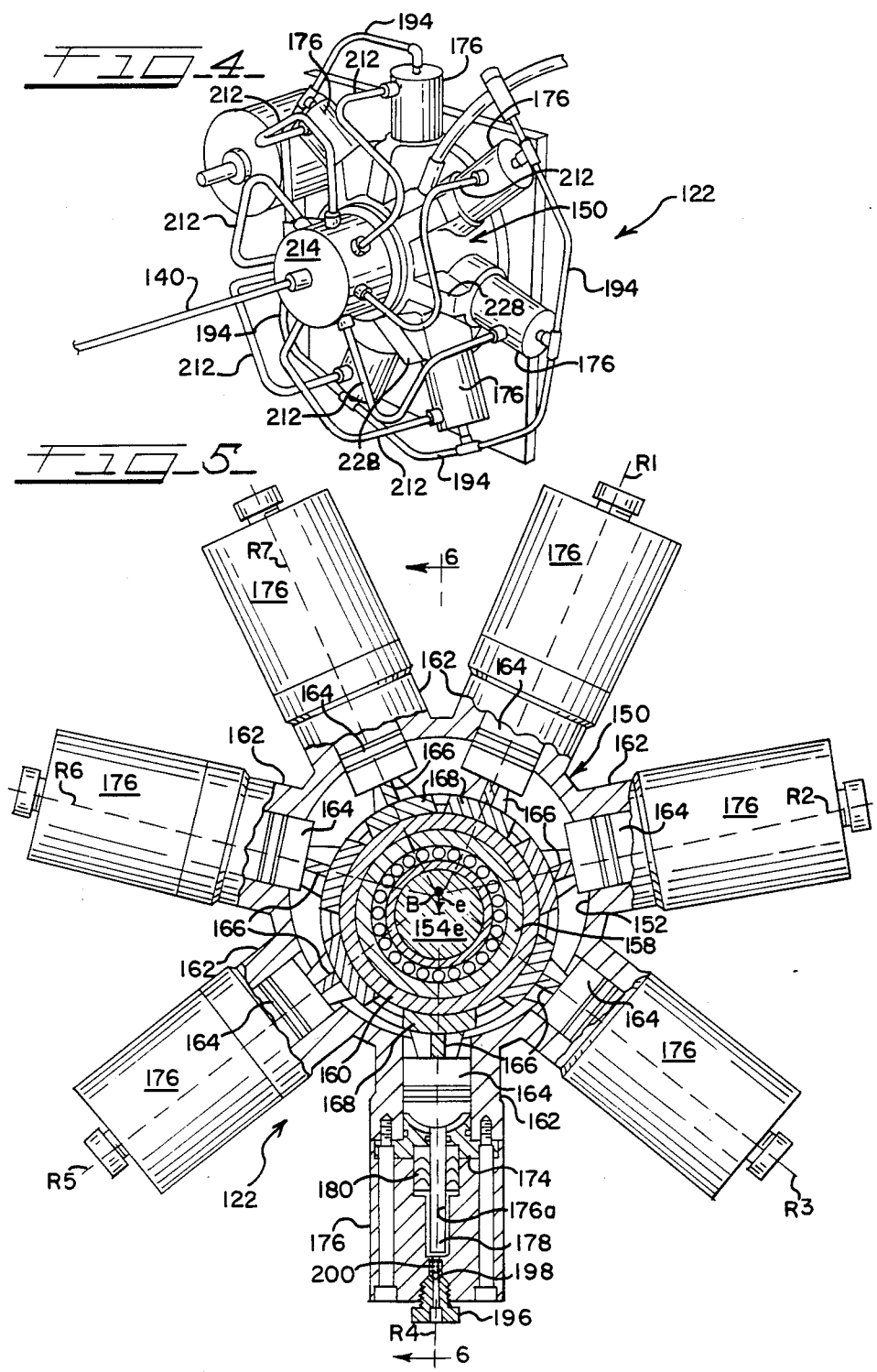

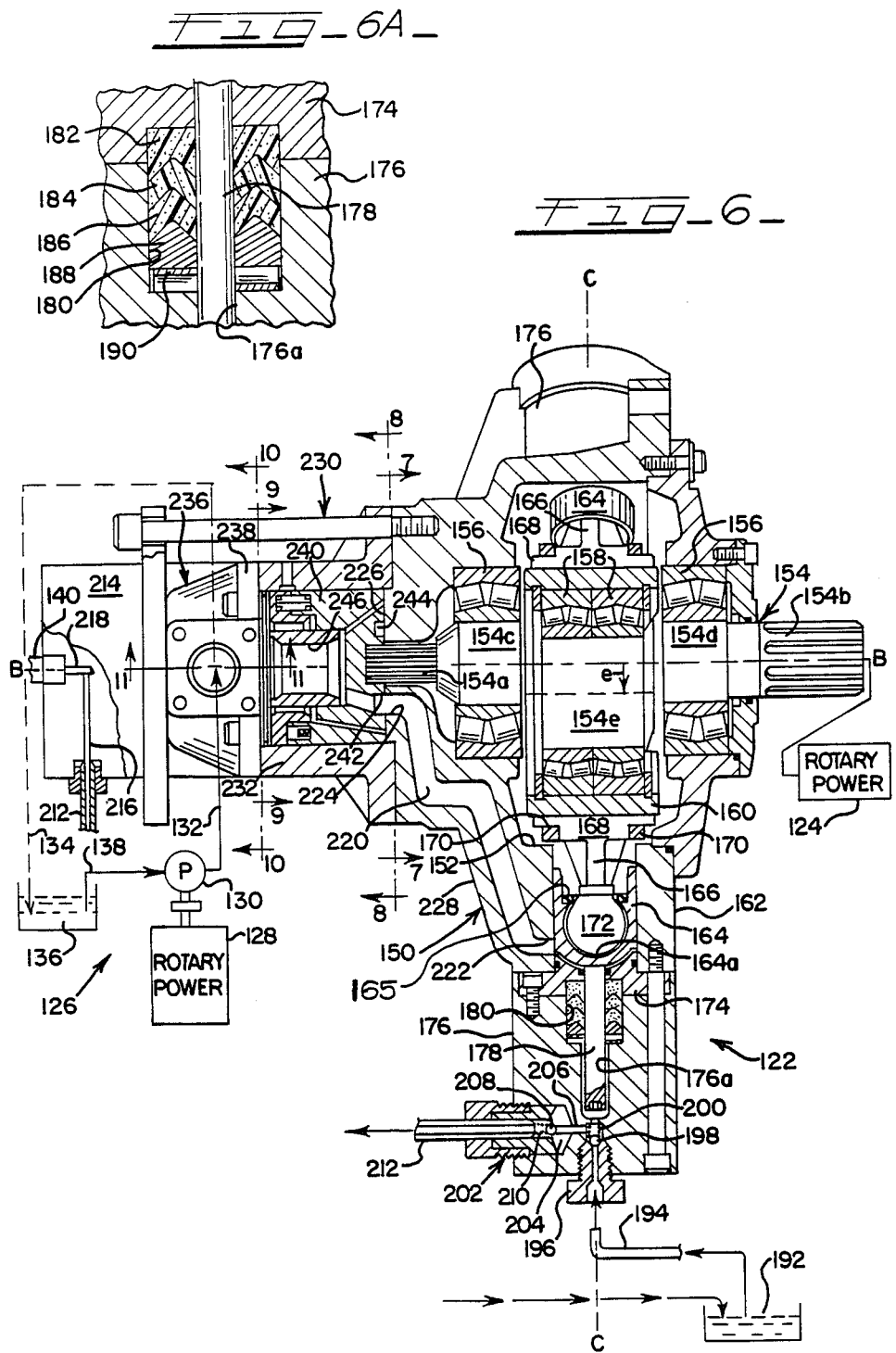

FIG-7-
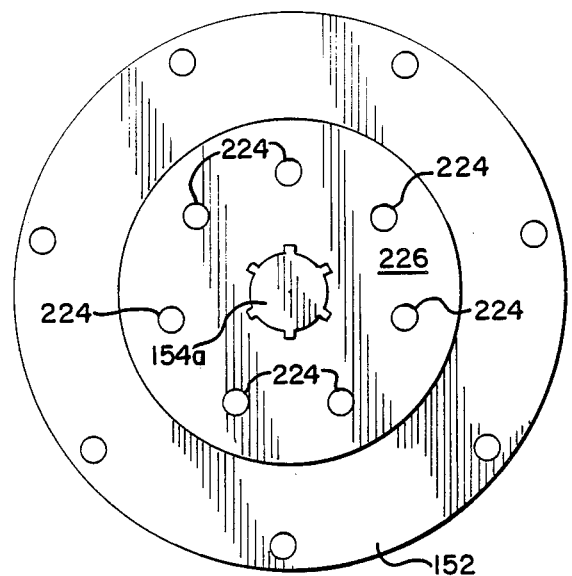
FIG-8-
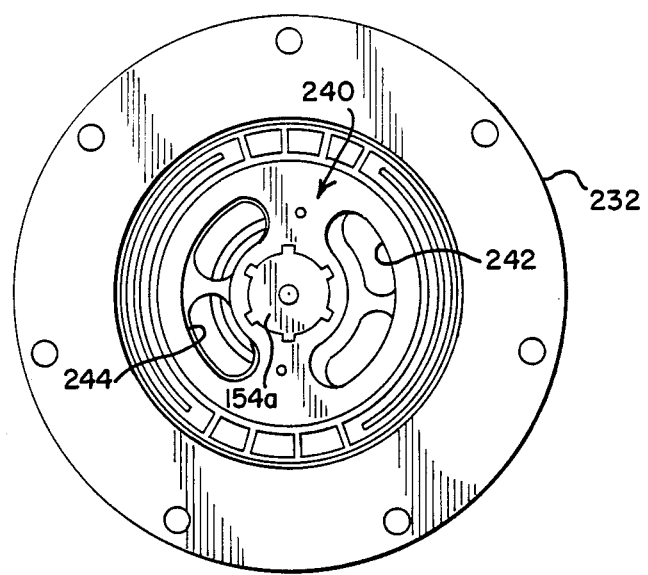

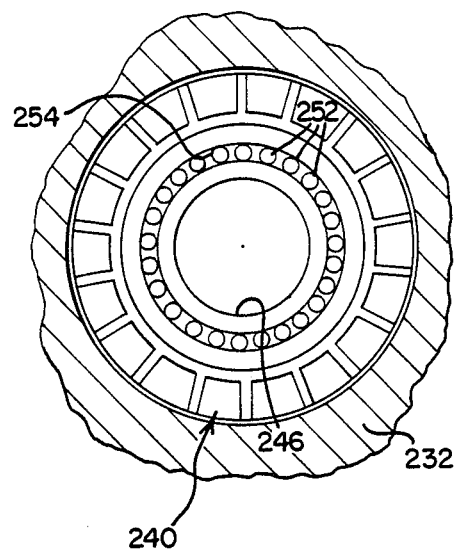
FIG_9_
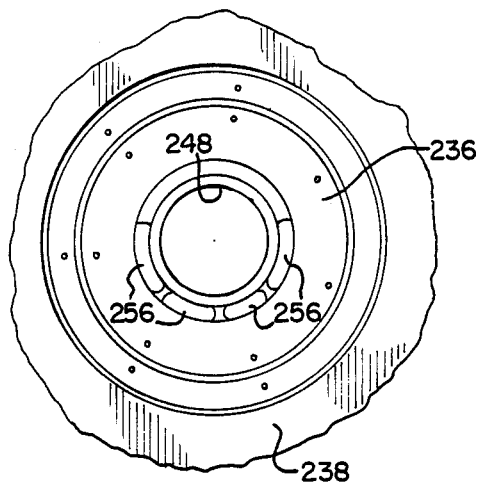
FIG_10_
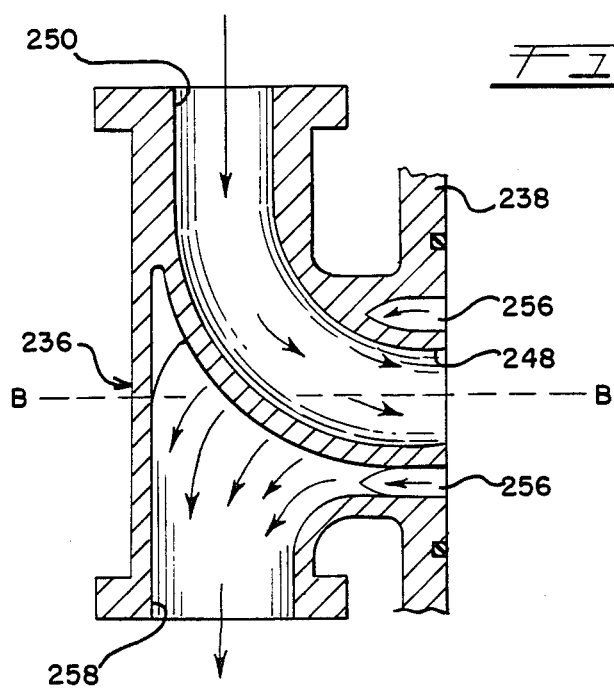
FIG_11_

FIG_12
a) DOUBLE
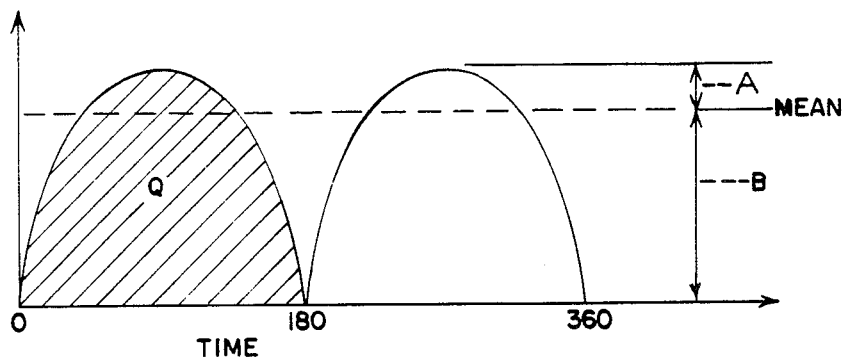
b) TRIPLEX
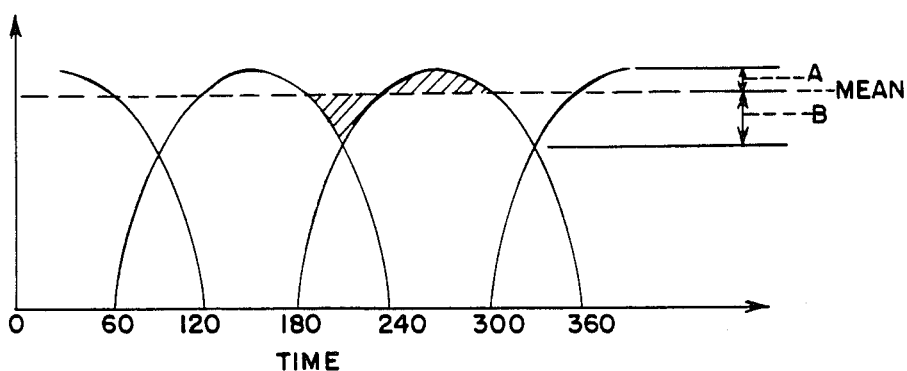
c) SEPTUPLEX
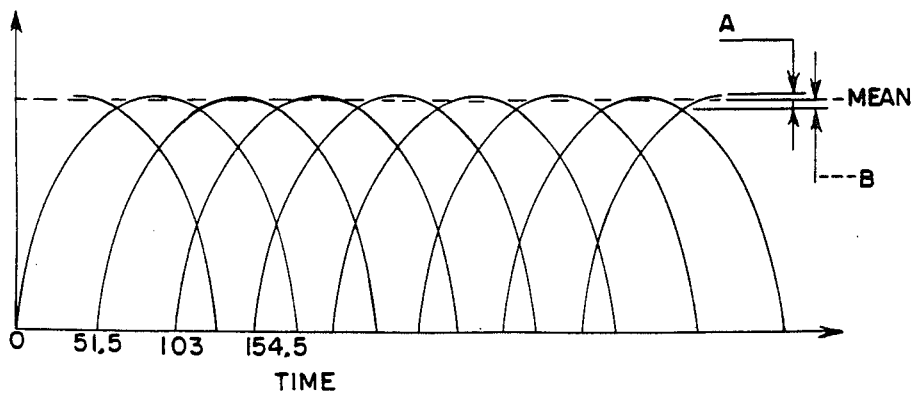

ized plastic material through aluminum, steel, titanium, concrete, glass, paper and other materials when the water is mixed with abrasive particles. Moreover, high velocity

SYSTEM FOR REMOVING MATERIAL WITH A HIGH VELOCITY JET OF WORKING FLUID

This is a continuation, of application Ser. No. 837,277, filed Mar. 7, 1986, now abandoned.

BACKGROUND OF THE INVENTION

1. Field of the Invention

The present invention relates to a new and improved system for removing material with a high velocity jet of working fluid and more particularly to a new and improved system employing an ultra-high pressure liquid pump capable of producing outlet liquid pressures in the range of 50,000 psi and above for use in forming a high velocity jet for cutting and removal of material from a workpiece impacted by the high velocity jet. In most applications, the working fluid comprises a high velocity stream of water formed by a high grade nozzle structure which discharges the water at velocities in excess of the speed of sound in a narrow stream. These high velocity jets of water are useful in cutting a wide variety of different substances ranging from styrofoam or plastic material through aluminum, steel, titanium, concrete, glass, paper and other materials when the water is mixed with abrasive particles. Moreover, high velocity water streams in accordance with the present invention have been used for surgical purposes and in mining operations for coal and a wide variety of metals and minerals.

2. Background of the Prior Art

High velocity, thin streams or jets of fluid such as water and water with abrasive material carried thereby have been used for cutting and abrading away a wide variety of materials. In some applications, hydraulically driven double acting piston intensifiers have been provided and while these types of intensifiers are capable of generating the needed ultra-high pressure for forming a high velocity jet stream, they have suffered from problems resulting from leakage and from the pulsating nature of the output of high pressure fluid therefrom. Moreover, previous high pressure intensifiers generated high noise levels and vibration resulting in maintenance problems and environmental objections to their use.

OBJECTS OF THE INVENTION

It is an object of the invention to provide a new and improved system for removing material with a high velocity jet of working fluid.

More particularly, it is an object of the invention to provide a new and improved system of the character described using water as a working fluid for abrading away or cutting a wide variety of materials including foams, plastic, aluminum, steel, rocks, paper, minerals and even exotic metals such as titanium.

Another object of the present invention is to provide a new and improved water jet cutting system for cutting and removal of materials without generation of heat in the material and without generation of excessive noises and vibration.

Yet another object of the present invention is to provide a new and improved system of the character described which is capable of accurate control and positioning for use in cutting away or severing materials and which is useful in surgical operations for cutting human tissue and bone.

In accordance with another object of the present invention, the apparatus is especially well adapted for cutting and removing delaminated concrete in floors, roads and buildings and is especially well adapted for providing extremely sharp and precise cuts without crushing or damaging of material adjacent to the line of cutting action.

It is another object of the present invention to provide a new and improved ultra-high pressure fluid pump especially well adapted for generating fluid pressure in the range of 50,000 psi and upward for use in high velocity fluid jet material cutting.

It is another object of the present invention to provide a new and improved ultra-high pressure fluid pump of the character described which can be powered by an external rotary power source or by the use of pressurized hydraulic fluid for reciprocating the piston structures of the pump.

Still another object of the present invention is to provide a new and improved ultra-high pressure fluid pump for the purposes set forth herein wherein output pressure fluctuations are minimized and wherein output pressure is almost a constant mean value closer to the maximum pressure than in previously available high pressure fluid pump systems.

Yet another object of the present invention is to provide a new and improved ultra-high pressure fluid pump of the character described which employs an odd numbered plurality of cylinders arranged in a radial configuration about a crankshaft eccentric.

Still another object of the present invention is to provide a new and improved fluid cutting head for removing material with high velocity jets of working fluid and particularly a new and improved fluid jet cutting head which provides for the continuous removal of the cutting fluid and material of the workpiece being cut so that an environmentally sound and cleam work area is provided.

Still another object of the present invention is to provide a new and improved fluid jet cutting head especially adapted for use in cutting and abrading away floor and wall surfaces formed of rock, concrete or other hard and abrasive materials without the generation of uncontrolled slurries of wet, sloppy workpiece material at the point of cutting.

BRIEF SUMMARY OF THE INVENTION

In accordance with the present invention, the foregoing and other objects and advantages are accomplished in a new and improved system for removing a wide variety of materials with a high velocity jet of working fluid such as water. At the heart of the system is new and improved ultra-high pressure pump which includes an odd numbered plurality of composite fluid cylinders disposed radially outwardly of the axis of rotation of an eccentric crankshaft. Each composite cylinder includes an inner low pressure cylinder and a longitudinally aligned outer high pressure cylinder and the composite cylinders are spaced equilaterally around the crankshaft axis in a common radial plane. A low pressure piston is mounted for reciprocation between inner and outer ends of each low pressure cylinder and is interconnected with the crankshaft to reciprocate back and forth on sequential pressure and exhaust strokes for each revolution of the crank. A high pressure piston is attached to move with each respective low pressure piston and is reciprocally mounted to produce ultra-high pressure fluid which is introduced into the high pressure end of each cylinder through an inlet check valve upon exhaust strokes of the pistons. Each high pressure cylinder includes an outlet check valve for expelling high pressure working fluid under ultra-high pressure as the high pressure piston moves on a pressure stroke. The crankshaft of the ultra-high pressure pump is rotatable by an externally coupled power source or by high pressure hydraulic fluid which is introduced into the low pressure cylinders of the pump to drive the crankshaft in rotation. A high pressure manifold interconnecting the outlet check valves of each high pressure cylinder is provided and is connected to a nozzle through an appropriate conduit system. Each nozzle includes an outlet designed to discharge a thin jet stream of high velocity working fluid against a workpiece to impact and cut or abrade away the material of the workpiece without generation of heat or other environmentally objectionable results. The system includes a new and unique fluid cutting head wherein a suction hood is provided around the nozzle for picking up material that is removed from the workpiece along with spent working fluid. A liquid curtain is provided around the suction hood to aid in entrapping the workpiece material as it is eroded away for pickup by the suction hood.

BRIEF DESCRIPTION OF THE DRAWINGS

For a better understanding of the present invention, reference should be had to the following detailed description when taken in conjunction with the drawings, in which:

FIG. 3A is a longitudinal cross-sectional view of another embodiment of a high pressure swivel connector in accordance with the features of the present invention.

FIG. 4 is an elevational perspective view of a new and improved ultra-high pressure pump in accordance with the features of the present invention for use in the system for removing material with a high velocity jet of working fluid;

FIG. 5 is a front elevational view of the pump of FIG. 4 with portions in section and broken away showing interior details thereof;

FIG. 6 is a cross-sectional view of the pump taken substantially along lines 6—6 of FIG. 5;

FIG. 6A is an enlarged, fragmentary, cross-sectional view of a new and improved ultra-high pressure piston seal in accordance with the present invention;

FIG. 7 is a cross-sectional view of the pump taken substantially along lines 7—7 of FIG. 6;

FIG. 8 is a cross-sectional view of the pump taken substantially along lines 8—8 of FIG. 6;

FIG. 9 is a cross-sectional view of the pump taken substantially along lines 9—9 of FIG. 6;

FIG. 10 is a cross-sectional view of the pump taken substantially along lines 10—10 of FIG. 6;

FIG. 11 is a cross-sectional view of the pump taken substantially along lines 11—11 of FIG. 6; and FIG. 12 is a graphic representation of the output pressure of the pump of the present invention in comparison to that of the prior art intensifier apparatus used heretofore.

DESCRIPTION OF A PREFERRED EMBODIMENT

Figure 1:
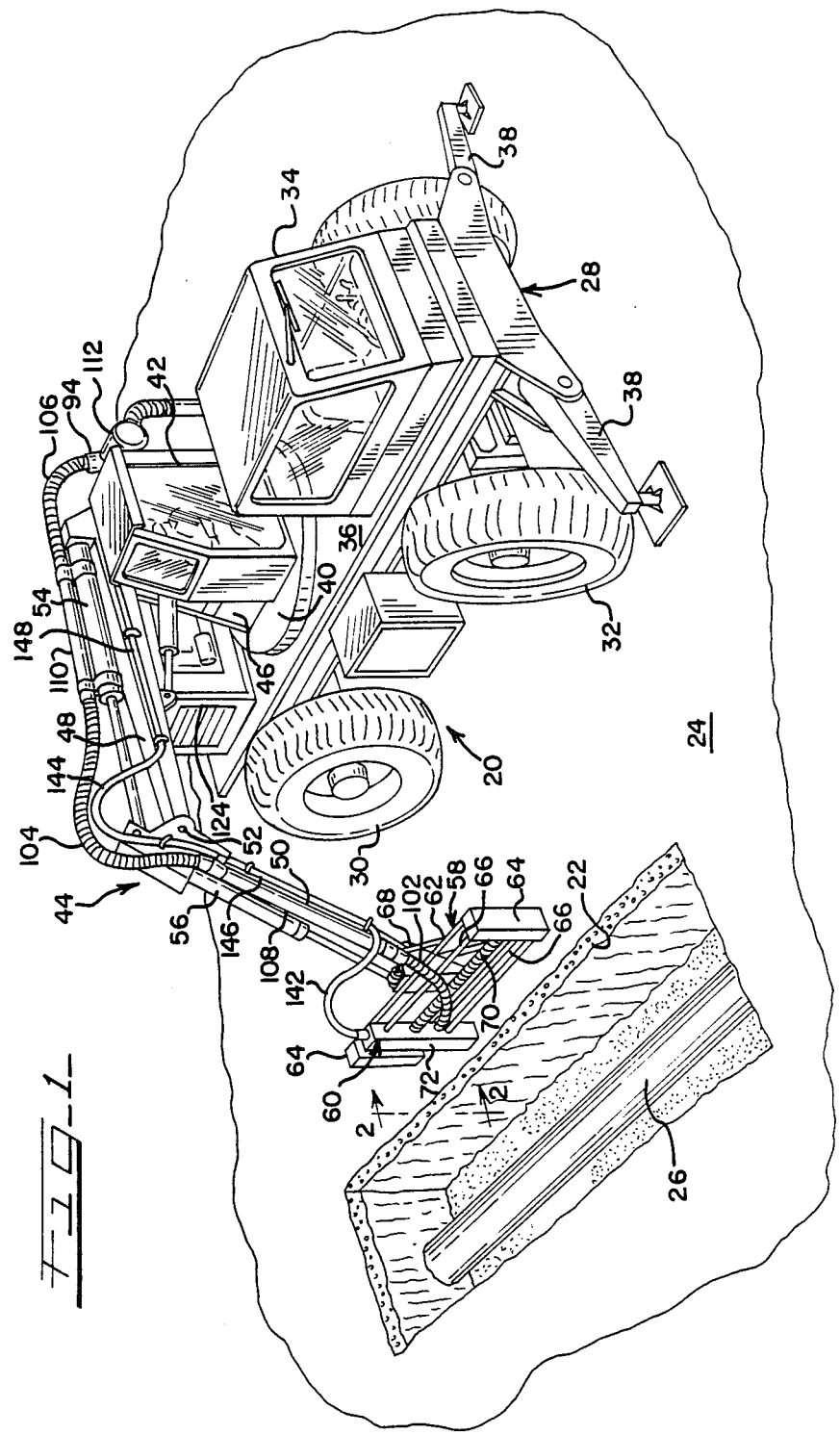
FIG. 1 is a perspective view of a new and improved system for removing material with a high velocity jet of working fluid.

Referring now more particularly to the drawings, in FIG. 1 is illustrated and new and improved system for removing material with a high velocity fluid jet in accordance with the present invention and referred to generally by the reference numeral 20. As illustrated, the system 20 is especially well adapted for cutting a precise opening 22 in a concrete slab or floor surface 24, as for example, for providing access to a buried pipe segment 26 to be serviced.

The system 20 includes a mobile vehicle 28 having rear wheels 30 and steerable front wheels 32 which are controlled from a driver's cab 34 so that the entire system may be moved from place to place over the road as desired. The mobile vehicle 28 includes a chassis or frame 36 and at the forward end, a pair of hydraulically controlled legs 38 may beprovided to stabilize the platform or chassis 36 adjacent a selected work location. A turntable 40 is mounted on the chassis 36 of the vehicle and is controlled to move to any desired rotational position about a vertical axis by an operator seated in an operating cab or enclosure 42.

An articulated arm structure 44 is secured to the rotatable turntable 40 on an upstanding support pedestal 46 adjacent the cab 42 and the articulated arm includes an inner arm segment 48 mounted for operator controlled pivotal movement about a horizontal axis at its inner end on the upstanding pedestal structure 46. At the outer end, the inner arm segment 48 is connected to an outer arm segment 50 by a pivot pin 52 so that the outer end of the outer arm may be raised and lowered as desired relative to the elevation of a concrete slab 22 or other workpiece adjacent which the system is positioned for water jet cutting action. The angular elevational position of the arm segments and movements thereof are controlled by hydraulic cylinders 54 and 56 which articulate the arm structure about the respective pivot axes on the pedestal 46 and the intermediate pivot pin 52. These hydraulic cylinders are controlled by valves provided in the operator's cab 42 in a typical manner. The rotary or azimuth position of the turntable 40 on the vehicle bed or platform 36 is also selected and controlled by valves in the cab.

At the outer end of the outer arm segment 50 there is provided a generally rectangular-shaped cutting head support structure 58 adapted to support and precisely position a fluid cutting head 60 (FIGS. 1 and 2) constructed in accordance with the features of the present invention. For this purpose, the cutting head support 58 includes a base plate 62 having vertical stop members 64 at opposite ends which support a pair of spaced apart upper and lower, horizontally extending support rails 66 on which the fluid cutting head 60 is mounted for controlled travel between the end stops.

The outer end of the outer arm segment 50 is pivotally connected to support the base 62 by means of a bracket 68 secured to the base intermediate its ends and the fluid cylinder 56 is operable to pivot the bracket about a horizontal axis to control or tilt the base plate in either direction from a generally vertically aligned position relative to the surface of the slab 24 or other workpiece which is to be cut or eroded away with a high velocity jet of working fluid in accordance with the invention.

The generally vertically extending fluid cutting head 60 is precisely controlled and movable along the horizontal rails 66 between opposite end stop 64 of the support structure by means of a horizontally extending jack screw 70 which is powered by a hydraulic motor (not shown) also controlled from the operator cab 42. The jack screw 70 engages a threaded nut carried by the fluid cutting head 60 so that the cutting head will move in either direction dependent upon the direction of rotation of the jack screw and additionally when the jack screw is stationary, the fluid cutting head will remain in any selected position as desired between the respective opposite end stops 64.

Figure 2:
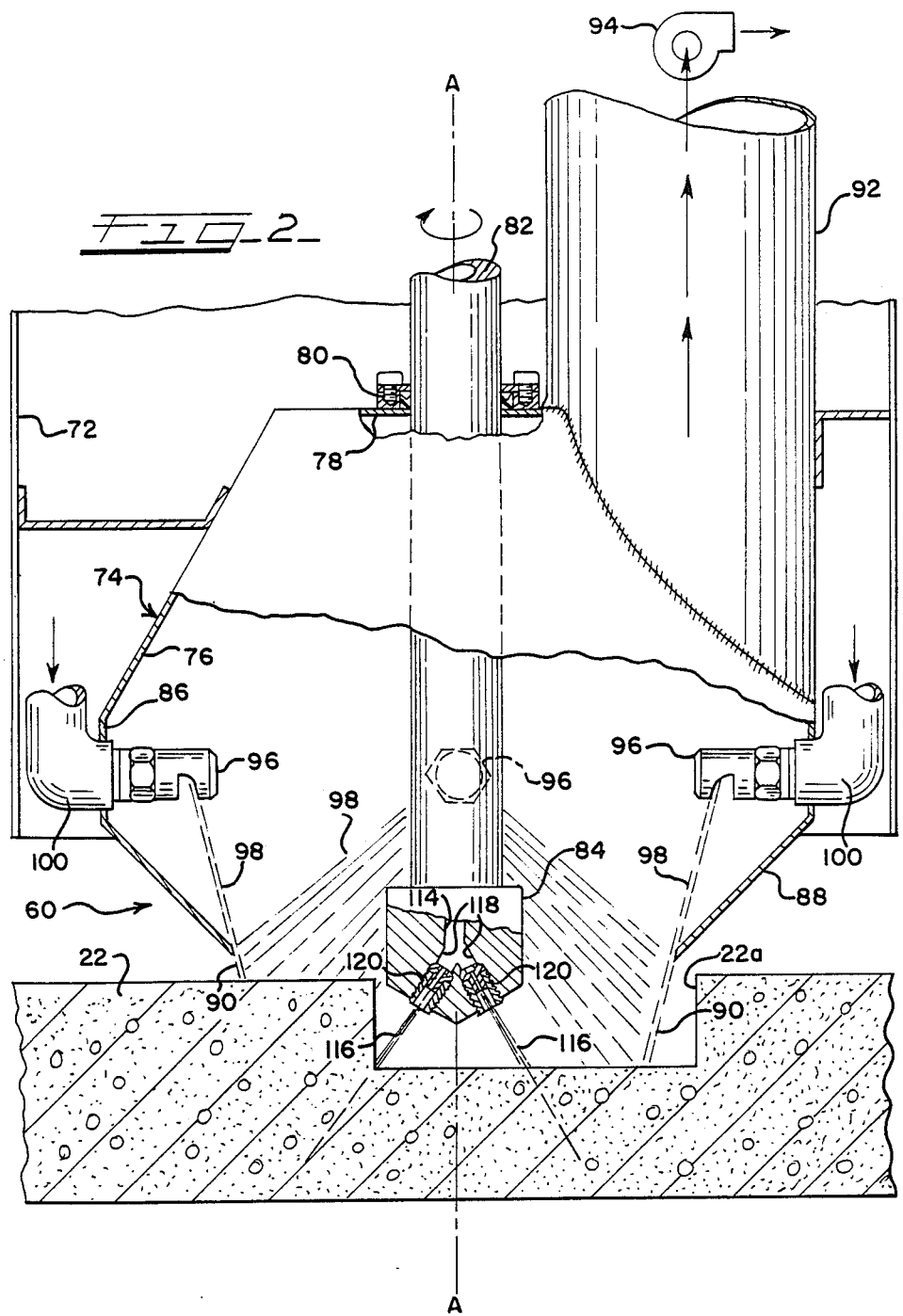
FIG. 2 is a fragmentary cross-sectional view of a new and improved fluid cutting head constructed in accordance with the features of the present invention.

In accordance with the present invention and particularly referring to FIG. 2, the fluid cutting head 60 includes a generally rectangular-shaped, upstanding enclosure or housing 72 having a double frusto-conically shaped suction hood structure 74 adjacent the lower end adapted to pick up the working fluid or water supplied by the system along with eroded material of the workpiece or the concrete material 22 that is removed by the high velocity water jet. The suction hood 74 includes an upper generally frusto-conically-shaped segment 76 having a horizontal upper end wall 78 provided with an opening and a seal and bearing structure 80 for accommodating a rotating tubular conduit 82 for supplying ultra-high pressure working fluid such as water to a nozzle head 84 at the lower end of the conduit. The suction hood includes a generally cylindrical intermediate segment 86 joined to the lower end of the upper section 76 and a lower frusto-conically shaped segment 88 is joined to the intermediate segment and includes a generally circular shaped opening at the lower end in coaxial alignment with the axis of the nozzle 84 and the rotating support conduit 82 indicated by the line A—A in FIG. 2.

In accordance with the present invention, the fluid cutting head 60 is provided with a generally cylindrical or frusto-conical-shaped, flowing water curtain 90 which extends downwardly from the edge of a open lower end of the frusto-conically shaped lower segment 88. The water cutrain encircles the cutting head nozzle 84 and flows downwardly to the adjacent upper surface of the workpiece or concrete slab 22. The water curtain tends to confine and remove debris and the working fluid supplied from the nozzle into the area immediately below the lower opening of the suction hood 74 for suction pickup by a duct or conduit 92 connected to the inlet side of a fan or pump 94 which is mounted on the mobile vehicle 28. It will thus be seen that fluid and debris generated by the cutting action from the high velocity jet streams of the nozzle 84 impinging on the workpiece or slab 22 is picked up immediately and is not released to expand or spread out appreciably to cause unacceptable environmental conditions in the immediate area where the fluid jet cutting is taking place.

Water to provide the surrounding water curtain 90 is supplied from a plurality of spray nozzles 96 positioned on the inside wall of the cylindrical intermediate hood section 86 and the nozzles and oriented with discharge sprays directed in fan shaped patterns 98 toward the lower edge of the circular opening in the frusto-conical lower segment 88 of the suction hood. Water for the spray nozzles 96 is supplied from a plurality of individual, water conduits 100, which conduits in turn are connected to a common water supply line supported from the articulated arm structure 44 (not shown).

As illustrated best in FIG. 1, there is provided a plurality of flexible, debris suction conduit sections 102, 104 and 106 connected between the suction conduit 92 in the fluid cutting head 60 and the suction fan or pump 94 on the mobile vehicle 28. In addition to these flexible conduit sections, the suction system includes solid conduit sections 108 and 110 mounted on the respective articulated arm segments 50 and 48. Workpiece debris and material from the slab 22 along with working fluid or water reaching the suction fan or pump 94 on the mobile vehicle 28 is treated in a separator 112 so that the liquid working fluid may be reutilized and the separated workpiece material can then be carried away from time to time after collection in a bin or other receptacle on the vehicle (not shown).

The ultra-high pressure nozzle 84 includes an axial inlet passage 114 receiving high pressure working fluid or water to provide a liquid jet for producing cutting action when the fluid is discharged in a thin high velocity stream from the nozzle structure. The working fluid or water enters the nozzle body under a pressure in the neighborhood of 50,000 psi as a minimum up to as high as 125,000 psi when desired or required for a particular application.

In order to provide and form a pair of water jet cutting streams 116 directed angularly outwardly of a common spin axis A—A so that a circular cutting path is generated at the point of impact between the water jet streams and the adjacent surface of the workpiece 22, a pair of angularly divergent passages 118 intersect the central supply passage 114 in the body of the nozzle 84. The divergent water jet streams provide for faster cutting action over a wider path or area as indicated by the groove 22a (FIG. 2) which has been formed by material being cut away from the slab by the impinging action of the high velocity streams.

At supply pressures of 50,000 psi and above, the nozzle 84 is capable of forming water jet streams having velocities as high as double or even triple the velocity of the speed of sound and these supersonic jet streams provide extremely effective cutting or eroding action on a wide variety of materials, even including such exotic metals as titanium. Moreover, the cutting is achieved without imparting heat or other objectional side effects to the material being cut.

As illustrated, in each of the divergent outlet passages 118 there is provided a replaceable, jet forming nozzle insert formed of high grade sapphire or similar abrasive resistant material and having an outlet orifice with a diameter substantially less than that of the passages 118. As wear occurs, the annular, threaded nozzle inserts 120 may be easily replaced. Most nozzle inserts have an outlet orifice diameter or in the range of 3/1000 to 20/1000 of an inch to provide the desired thin, supersonic, jet cutting stream. In a typical example, when the water pressure supplied to the inlet conduit 82 is around 60,000 psi and the nozzle inserts 120 have a bore of approximately 5/1000 of an inch, the jet streams of water will have a speed of approximately twice that of the speed of sound and a flow rate of approximately 15 gallons of water per hour will be utilized in a typical application. This volume flow of working fluid plus the flow of water for forming the circular collection curtain 90 can readily be handled by the suction hood pick up conduit system and separator 112 so that debris and noise generation is not deleterious to the immediate environment. The surrounding water curtain 90 of the cutting head 60 acts efficiently to dampen the noise generated by working fluid moving at supersonic velocity from nozzle inserts 120 and the overall noise level of the cutting head 60 is considerably less than that of a typical jackhammer and air compressor in operation as commonly seen on the streets.

Referring now more particularly to FIGS. 4 through 12, at the heart of the system 20 is an ultra-high pressure working fluid pump of a radial, multiple cylinder type indicated generally by the reference numeral 122. The pump 122 is mounted on the platform 36 of the mobile vehicle 28 and is adpated to be powered by an external rotary power source 124 such as a diesel or a gasoline engine (also mounted on the vehicle) or by a pressurized hydraulic system 126 shown schematically in FIG. 6. The hydraulic system includes a rotary power source 128 driving a relatively low pressure hydraulic pump 130 having an output pressure in the range of 1000 to 3000 psi supplied to the ultra-high pressure pump 122 through a hydraulic supply conduit 132. Returning fluid is carried through a return conduit 134 and is discharged into a hydraulic reservoir 136 which provides a supply of fresh fluid to an inlet conduit 138 in communication with the inlet side of the hydraulic pump 130 in a manner typical of low pressure hydraulic systems.

When the ultra-high pressure pump 122 is running, pressurized working fluid or water in the range of 50,000 to 60,000 psi is supplied from an outlet conduit 140 connected to the pump 122 to the fluid cutting head 60 through a plurality of interconnected, ultra-high pressure, flexible fluid conduits 142, 144 and fixed conduits 146 and 148 mounted on the respective arm segments 50 and 48 of the articulated arm structure 44.

The ultra-high pressure, radial pump 122 includes a central pump block or body 150 which forms a generally cylindrically-shaped crankcase 152 in which is journalled a crankshaft 154 mounted for rotation about an axis B—B as shown in FIG. 6. The crankshaft includes a pair of splined shaft segments 154a and 154b at opposite ends and a pair of intermediate, coaxial bearing segments 154c and 154d spaced on opposite sides of a cylindrically-shaped, eccentric segment 154e which moves in an orbit having a radius of eccentricity "e" around the main axis of shaft rotation B—B as best shown in FIGS. 5 and 6. The crankshaft 154 is supported for rotation in the crankcase housing 150 on a pair of bearing rings 156, preferably of the tapered roller type as shown in FIG. 6, and a pair of similar tapered bearing ring assemblies 158 are mounted on the eccentric segment 154e to support an annular, cylindrical, eccentric sleeve or ring 160 which travels in orbiting movement about the axis B—B.

In accordance with the present invention, the pump block 150 includes an odd numbered plurality of integrally formed, low-pressure cylinders 162 extending radially outwardly from the cylindrically-shaped, central crankcase 152 and the cylinders are aligned on equilaterally spaced apart radials R-1 through R-7 as shown in FIG. 5. The radials lie on a common plane C—C (as shown in FIG. 6) normal to the crankshaft axis B—B. As the crankshaft 154 rotates about the axis B—B, the eccentric segment 154e moves toward and away from each of the odd numbered radially extending, low pressure cylinders 162 during each rotation of the shaft to provide pressure and return strokes which are equal in length to twice or two times the distance of crank eccentricity "e".

In each cylinder a low pressure piston 164 is mounted for reciprocal movement and the low pressure pistons are operatively interconnected with the eccentric segment 154e of the crankshaft by connecting rod assemblies 166 having arcuately shaped bearing shoes 168 at the inner end designed to bear against the outer cylindrical surface of the eccentric, crank ring cylinder 160. As best shown in FIG. 6, the shoes are maintained in contact against the outer surface of the eccentric ring cylinder 160 by a pair of annular retaining rings 170 disposed along opposite edges of the shoes. Each connecting rod assembly also includes a spherical ball member 172 at the outer end, which ball is seated in a socket 164a provided in the adjacent piston 164 (as best shown in FIG. 6) and held in place with a retaining ring 165. A ball and socket joint is thus provided between each low pressure pistons 164 and its associated connecting rod assembly 166 so that each piston moves on successive power and return strokes inwardly and outwardly in a respective low-pressure cylinder 162. Because of the relatively large odd number of seven radial cylinders (illustrated graphically in FIG. 12c), during a single revolution of the crankshaft seven pistons reach a top dead center and a bottom dead center position and this provides for much less fluctuation in output pressure than is provided by a prior art type double acting, single cylinder, longitudinally reciprocal hydraulic intensifier as graphically represented in FIG. 12a. It will thus be seen that the mean output pressure of a seven cylinder, ultra-high pressure, radial pump 122 in accordance with the present invention is substantially closer to the maximum pressure produced in each cylinder (as represented by the letter A in FIG. 12c) than is the mean pressure in a double acting longitudinal cylinder type intensifier as represented in FIG. 12a or a triplex unit as represented by the curve in FIG. 12b.

Each low pressure cylinder 162 is fitted with a cylinder head or outer end cap 174 having a concave inner surface forming the outer end wall of the low pressure cylinder and shaped generally to match the dome shaped head of the piston 164 as shown in FIG. 6. Outwardly of each cylinder head there is provided a high pressure cylinder 176 in coaxial alignment with the adjacent low pressure cylinder inwardly thereof. Each high pressure cylinder has a bore 176a having a cross-sectional area that is a fraction of the cross-sectional area of the lower pressure cylinder 162 associated therewith. For example, the cross-sectional area of the low pressure cylinders may be 20 to 30 times greater than that of the adjacent high pressure counterparts associated therewith in order to produce the ultra-high fluid pressure that is needed for the high pressure fluid jet cutting. Each high pressure cylinder 176 is provided with an elongated, cylindrical, ringless, piston 178 attached to the piston head of the associated low pressure piston 164 and designed to reciprocate therewith in coaxial alignment.

In accordance with the present invention and specifically referring to FIG. 6A, a cylindrical sealing chamber 180 is formed between each composite pair of coaxially aligned low pressure and high pressure cylinders around an inner end portion of the high pressure piston 178. Each sealing chamber 180 contains an annular high pressure seal which performs a dual task of sealing between the high pressure working fluid in the high pressure cylinder 176 and the low pressure fluid in the low pressure cylinder 162. In addition, the annular seal helps to stiffen and prevent the high pressure piston 178 from buckling under the extremely high pressures at the outer end of the cylinder as the piston reciprocates back and forth. Each high pressure sealing chamber contains a set of sealing rings comprising an inner backup ring 182 formed of material having three important characteristics, namely, a low coefficient of friction, a high coefficient of mechanical strength and a high wear resistance property along with a generally dry lubricating property.

Materials used for the inner backup ring 182 have comprised a mixture of polyamide resin with graphite and polytetrofluoroethylene or TEFLON ™. The inner backup ring 182 is formed with a transverse cross-section combining a flat inner end face and a V-shaped outer end face having an inner sealing lip which functions to seal and press tightly against the surface of the high pressure piston 178. This sealing lip is useful to prevent the possible extrusion of a next adjacent pair of intermediate seal rings 184 and 186 through the clearance space between the piston 178 and the surrounding cylinder wall. Extrusion of sealing rings can be a problem because of the ultra-high pressures involved, even though the amount of clearance is a minimum and is accurately controlled.

The intermediate sealing rings 184 and 186 also have V-shaped or chevron-shaped cross-sections (as illustrated) on opposite end faces to provide effective tapered lip sealing action against the wall of the chamber 180 and around the reciprocating high pressure piston 178. These intermediate seal rings may be formed in a precision molding operation from a compound of polyamide resin impregnated with graphite for strength and embodying the same three physical characteristics as the inner backup ring 182.

An outer backup ring 188 is provided to engage the outer V-shaped annular face of the sealing ring 186 and this outer backup ring has a flat annular outer end face and is formed of metal such as bronze or brass having excellent strength characteristics and a low coefficient of friction. The sealing rings 184, 186 and the inner and outer backup rings 182 and 188 are compressed longitudinally within the sealing chamber 180 by spring pressure provided from an annular wave spring 190 formed of spring metal having suitable high strength, resilient spring characteristics.

It has been found that the high pressure sealing assembly contained in each sealing chamber 180 is thus extremely effective for sealing around the high pressure reciprocating piston 178 as it moves between the outer high pressure cylinder 176 and the inner low pressure cylinder 162. Even though very high pressure differential is present, the sealing rings efficiently support the piston 178 against buckling and provide a low friction sealing engagement therewith which is effective and has a long operating life.

Working fluid for the system such as water is supplied to each high pressure cylinder 176 from a common supply reservoir 192 and individual conduits 194 extending to an inlet fitting 196 threaded into an axial bore in each ultra-high pressure cylinder head aligned coaxially with the reciprocating piston 178. An inner end of the threaded fitting 196 is formed with a frusto-conically shaped valve seat which cooperates with an inlet check valve element comprising a small size ball 198 biased against the seat by a valve spring 200. During outward compression strokes of the high pressure pistons 178, fluid is prevented from flowing axially outwardly into the fitting 196 and the conduits 194 by the tight sealing action of the valve balls 198 against the frusto-conical seating surfaces. During inward or suction strokes of the piston 178, fluid from the reservoir 192 is drawn through the individual conduits 194 into the outer end of each high pressure cylinder bore 176a until the piston reaches a bottom dead center position and begins to reverse the direction of travel to move outward on a pressure stroke. When this occurs, the inlet check valve ball 198 seats and pressurization of the trapped fluid within the outer end of the high pressure cylinder takes place.

Referring to FIG. 6, each high pressure cylinder 176 is also provided with an outlet check valve assembly 202 comprising an annular valve seat ring 204 having a central fluid passage therein in communication with an outlet passage 206 at right angles to the cylindrical bore 176a adjacent the outer end thereof. The valve seat ring 204 is formed with a frusto-conically shaped outwardly facing valve seating surface surrounding and coaxially aligned with the outlet passage 206. An outlet check valve ball 208 is biased tpward a seated position by an outlet check valve spring 210. The strength characteristic of the valve spring is selected to provide for a desired operating pressure to be produced by the pump 122. As each high pressure piston 178 moves outwardly on a compression stroke, the respective outlet valve ball 208 remains seated or closed until the desired pressure level is reached which unseats the ball against the force of the valve spring 210. As this occurs, pressurized fluid at ultra-high pressures ranging from 50,000 psi to as high as 60,000 psi flows outwardly into an outlet tube 212. An outlet tube from each high pressure cylinder 176 is connected to a common collector manifold 214 mounted in coaxial alignment with the axis B—B of crankshaft rotation. The collector 214 includes a plurality of inlet passages 216 directed radially inwardly from the high pressure tubes 212 from the cylinders. Inner ends of the passages 216 are in connection with a common, centrally disposed, axial outlet passage 218 which is connected to the ultra-high pressure supply conduit 140 as shown in FIG. 6.

In accordance with an important feature of the present invention, the ultra-high pressure pump 122 may be powered from an external rotary power source 124 such as a diesel engine or a gasoline engine having an appropriate gear reduction unit and coupled directly to the splined shaft end segment 154b. The speed of pump rotation is adjustable and is regulated so that the desired output pressure is available for the job at hand. In general, the shaft 154 is rotatively driven at speeds of 500 rpm and less and as illustrated in FIG. 12c, the seven cylinder, radial pump 122 provides a relatively even output pressure having a mean value close to the maximum pressure achieved in each of the respective cylinders. At lower speeds, lower operating pressures will be generated in the high pressure cylinders 176.

In an alternative method of operation, the pump 122 may be driven from a low pressure hydraulic system 126 as previously mentioned and for this purpose, each low pressure cylinder 162 is provided with a fluid passage 220 (FIG. 6) having one end in communication with the cylinder 162 at a side port 222 on the cylinder wall adjacent the cylinder head 174 and an opposite end connected or terminating in a port 224 on a generally cylindrical radial end face 226 of the pump body 150 outwardly around the crankshaft axis B—B as shown in FIGS. 6 and 7. Each fluid passage 220 is integrally formed in a radial rib structure 228 joined to the crankcase section 152 and the respective low pressure radial cylinders 162. When pressurized hydraulic fluid supplied by the pump 130 is introduced by a fluid passage 220 into the outer end of a low pressure cylinder 162 through a port 222, the piston 164 is urged inwardly and the associated connecting rod assembly 166 exerts an inward thrusting force on the eccentric ring 160. The sequential inward thrust forces from the connecting rod assemblies around the crankshaft 154 produces rotative torque on the eccentric segment 154e of the crankshaft causing the crankshaft to rotate. Pressurized hydraulic fluid is supplied under operating pressure to each respective low pressure cylinder 162 in rotational sequence and when each piston 164 reaches bottom dead center and begins to move outwardly towards the cylinder head 174, the fluid within each low pressure cylinder is pushed back out through cylinder wall port 222 and the connecting fluid passage 220 towards the port 224 on the circular end face 226 of the pump body.

Sequential flow of pressurized hydraulic fluid into and out of the radially disposed fluid passages 220 connected to the respective low pressure cylinders 162 is controlled by a rotary distribution valve 230 having a flanged outer housing 232 of generally cylindrical shape in coaxial alignment with the axis of rotation B—B of the crankshaft 154. The valve housing 232 is formed with a generally cylindrical bore 234 and is closed at the outer end by an inlet and outlet fitting 236 (FIGS. 6 and 11) having a flange wall 238 secured to the outer end of the valve housing.

A generally cylindrically shaped, hollow valve rotor 240 is mounted in the valve housing 232 and is driven by the splined end segment 154a of the crankshaft 154 to rotate therewith about the axis B—B. As best shown in FIG. 8, the inner face of the valve rotor is formed with an arcuately shaped high pressure fluid outlet 242 for communication at all times with at least two or more of the inlet ports 224 of the fluid passages 220 leading to at least a pair of respective radial cylinders 162 as the rotor is turning. The valve rotor is formed with a similar, diametrically opposite, arculately shaped return passage 244 for receiving return fluid from at least two of the ports 224 of the fluid passages 220 as the fluid is returned by the action of the outwardly moving low pressure pistons 164. The high pressure, arcuate slot 242 is in continuous communication with a central bore 246 of the valve rotor as best shown in FIG. 6 and the central bore in turn is in communication with an inlet fluid passage 248 of the inlet/out hydraulic fitting 236.

Pressurized hydraulic fluid supplied from the pump 130 and line 132 is continuously fed to a flanged upper inlet port 250 on the fitting 236 to provide the necessary hydraulic fluid for turning the eccentric segment 154e of the crankshaft when the pump 122 is operated in a hydraulically powered mode. Returning hydraulic fluid from the ports 224 of the passages 220 in the pump block 150 is directed from the arcuate passage 244 in the valve rotor 240 through a plurality of small passages 252 which terminate in an annular ring passage 254 adjacent the flange face 238 of the inlet and outlet fitting 236. This returning fluid moves from the valve rotor 240 into the fitting 236 through a plurality of return passages 256 in communication with a flanged outlet port 258 connected to the hydraulic return line 134 leading to the supply reservoir 136 as shown schematically in FIG. 6.

It will thus be seen that the ultra-high pressure pump 122 may be driven by directly coupled mechanical torque from an external rotary power source 124 such as an engine or motor or, in the alternative, the pump may be driven by pressurized hydraulic fluid moving to and from the respective low pressure cylinders 162 in controlled sequence through the rotary distribution valve 230 as described.

In mobile installations of the system 20 as illustrated in FIG. 1, the hydraulic system of the vehicle itself may be available to provide the needed pressurized hydraulic fluid and in this case, a separate external prime mover such as a diesel or gasoline engine for driving the hydraulic pump may not be required. In other installations where a hydraulic system is not readily available, a suitable motive power unit such as a gasoline engine, electric motor or a diesel engine may be provided to turn the crankshaft 154 through a mechanical coupling and an appropriate gear reduction and control unit. In either event, the speed of rotation of the crankshaft 154 is an important factor in determining the output pressure to be available from the high pressure cylinders 176 and the volume flow of ultra-high pressure fluid that is to be made available to the cutting nozzle 84 of the cutting head assembly 60.

In applications of the present invention wherein metal or other materials are to be cut with a single narrow cut rather than a wider erosive path as illustrated in FIG. 2, a nozzle body will be provided having but a single, nozzle forming outlet insert 120. In this type of application, the outlet orifice of the nozzle insert is generally aligned in coaxial alignment with the supply conduit or member supporting the nozzle. In these types of applications it is usually not necessary or desirable to have a rotating support conduit or shaft and a simple conduit fixed against rotation or casually rotatable will suffice.

In the particular application illustrated in FIG. 2, it is desirable to provide a rotatable swivel connection between the ultra-high pressure supply conduit 140 from the pump 122 and the nozzle structure 84 and its supporting supply conduit 82. For this purpose, an ultra-high pressure, high speed swivel 260 is interconnected between the ultra-high pressure supply conduit 140 and the nozzle supply conduit 82. The swivel is supported on a bracket 262 which in turn can be mounted in the rectangular housing 72 of the fluid cutting head assembly 60 above the suction hood 74. The support bracket 262 also provides a support leg 264 on which is supported an electric motor 266 for driving the swivel to rotate. The electric motor is supplied with electric current through an electrical cable 268 which is flexible and supported on the articulated arm 44 for connection to a suitable source of electrical power on the vehicle 28. A hydraulic motor can also be used. When the motor is energized, a rotor shaft 266a turns a V-belt pulley 270 on the swivel 260 by means of a V-belt 272. A small diameter pulley 274 carried on the motor shaft provides for speed reduction as necessary. The speed of the motor is selected and controlled to provide the desired rpm range for the nozzle 84 which is connected through the conduit 82 to rotate at the same speed as the pulley 270.

The high pressure swivel 260 of the present invention includes an outer housing 276 and an inner, hollow, elongated rotating shaft 278 which extends into the lower end of the housing. The shaft is keyed to be rotated by the pulley 270, and is hollow to handle the ultra-high pressure fluid flowing through the swivel. The rotating shaft 278 is connected to the nozzle conduit 82 at a threaded lower end 304 and has a radial flange structure 280 intermediate the ends of the shaft which is mounted to rotate between two sets of bearing rings 282 and 284. The flange is supported for rotation relative to the outer housing 276 by the bearing rings which are mounted in the lower end portion of the housing. A cylindrical seal chamber 286 is provided between the inner, rotating shaft 278 and the outer wall of the swivel housing and a high pressure packing assembly is mounted in a lower end portion of the chamber to form an ultra-high pressure seal around the rotating shaft.

The sealing chamber is filled to a level above the level of the packing rings with a visco-elastic lubricant fluid 288, which, by reason of its physical properties, tends to climb or rise along the rotating shaft, thereby providing an increased depth of lubricant adjacent the surface of the rotating shaft. Because of this property of the lubricant, even a small amount of fluid will tend to lubricate and seal the rotating shaft at the region where the shaft passes through the rings of packing material.

In accordance with an important aspect of the invention, the high pressure packing assembly comprises a plurality of annular, seal rings 290 of chevron-shaped cross-section mounted between correspondingly shaped upper and lower surfaces of a pair of retaining rings 292 and 294. The retaining rings are biased downwardly by a compressed, coaxial coil spring 296 to force the outer lips of the chevron-shaped rings 290 in tight fitting engagement with the wall of the chamber 286 and to bias the inner lips of the sealing rings against the moving surface of the rotating shaft 278. The upper end of the seal chamber is closed with an annular bushing 298 spaced between the coil spring 296 and an outer retaining cap 300 on the upper end of the housing 276. The bushing is formed with one or more fluid passageways 302 in the seal chamber 286 for equalizing the pressure with that of the ultra-high pressure working fluid.

Figure 3:
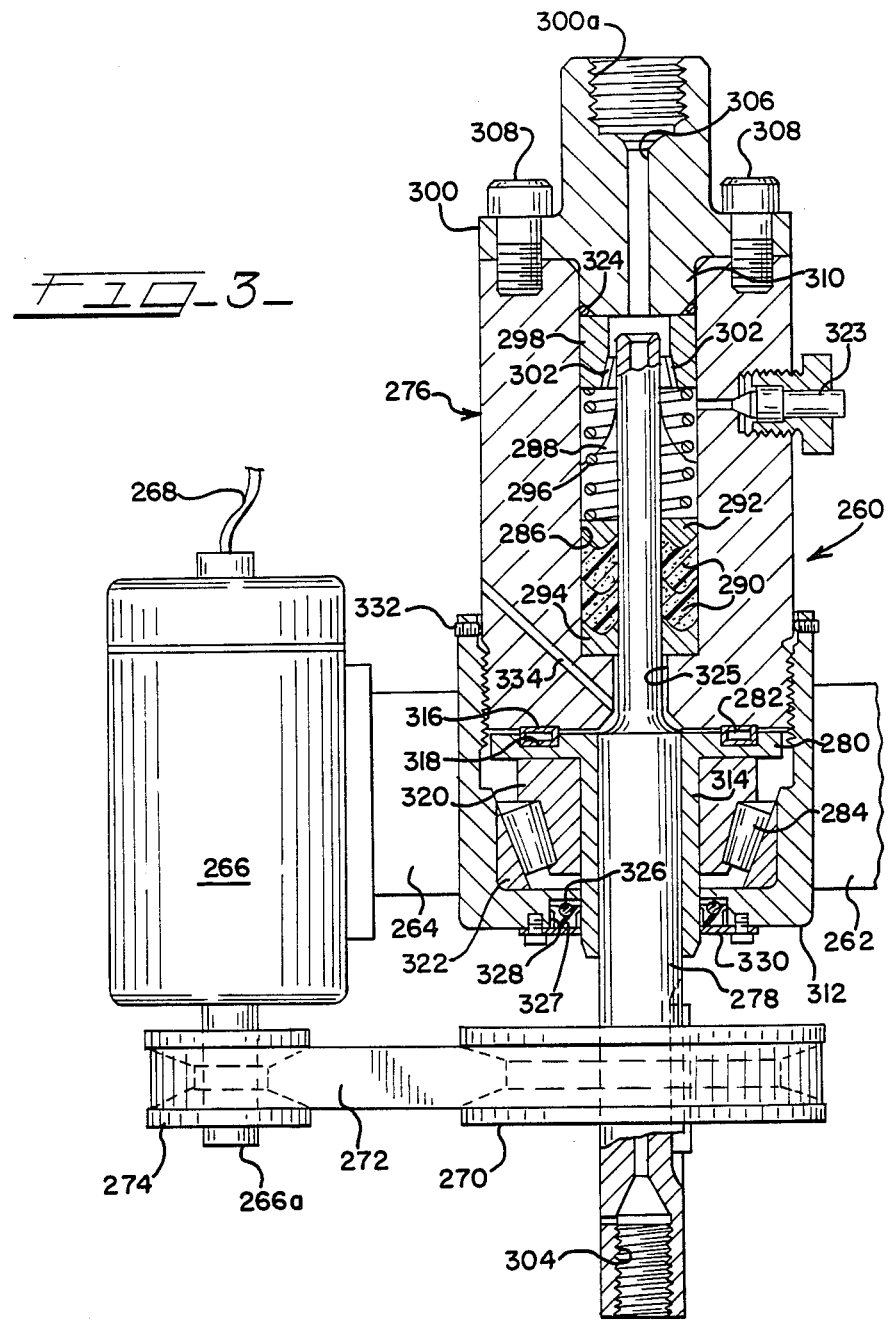
FIG. 3 is a longitudinal cross-sectional view of a new and improved high pressure swivel connector for working fluid constructed in accordance with the features of the present invention.

Turning now to a more detailed consideration of the swivel, which is shown in an embodiment in FIG. 3, the swivel 260 is designed to permit relatively fast rotation of the inner rotating shaft 278 which communicates via its threaded lower end 304 to the cutting nozzle 84 through the rotating conduit 82. The upper end cap 300 has a threaded inlet 300a which is supplied with working fluid at ultra-high pressure from the outlet conduit 140 of the pump 122. The cap has a central channel 306 through which the pressurized fluid is communicated to the upper end of the seal chamber 286. The upper end cap is removable and is normally secured to the outer housing 276 with cap screws 308 which are received within threaded openings drilled in the end of the housing wall. The upper end cap also has a central, cylindrical extension 310 on the underside, which is sized for close fitting insertion into the upper end of seal chamber 286.

The lower end of the outer housing 276 is closed with a lower end cap 312 of cup-shaped configuration, and the flange 280 on the rotating shaft 278 is mounted between the interior surface of an annular lower end wall of the lower cap and the bottom end surface of the outer housing 276. The shaft flange is formed at the upper end of a hollow sleeve 314 which is integrally attached to the shaft body by suitable means such as a welding or press fitting. The radial shaft flange 280 is supported for free rotation between a ring of needle-type thrust bearings 282 spaced above the flange and a larger ring of tapered roller bearings 284 spaced below, thus allowing the inner shaft 278 to rotate freely with respect to the outer housing 276. The needle thrust bearings are positioned to ride within cooperating, facing, annular grooves formed in the bottom surface of outer housing 276 and the top surface of radial flange 280.

The upper surface of radial flange has a shallow, annular groove 318 for receiving the needle bearing ring assembly 282 and the lower end surface of the body 276 has a matching groove 316. The somewhat larger sized ring of tapered roller bearings 284 is positioned between the bottom surface of radial flange 280 and the cylindrical, interior surface of the lower end cap 312. The tapered roller bearings are designed to handle axial thrust loading and are mounted in a ring between an inner race 320 telescopically received over the sleeve 314 on the shaft 278 and an outer race 322 seated within the side wall of the lower end cap 312 at the bottom.

An elongated, smaller diameter, upper portion of the rotating shaft 278 extends upwardly into the seal chamber 286 through a central aperture 325 formed in the lower end wall of the outer housing 276. The shaft is hollow and conveys the ultra-high pressure working fluid from an upper threaded inlet 300a on the upper end cap 300 downwardly through the swivel body to the nozzle 84 at the lower end of the conduit 82.

For the purpose of cutting, drilling, sand blasting or cleaning, etc., the nozzle 84 is often rotated at speeds up to as high as 250 rpm and the working fluid pressures may vary from 50,000 psi up to 60,000 psi. Typically, the outer housing 276 is held in position fixed against rotation by the bracket 262 and the inner shaft 278 is rotated relative thereto. However, in other applications, the relative rotation could be reversed without departing from the concept of the present invention.

In order to seal between the relatively fast rotating inner shaft 278 and the usually fixed outer housing 276, the packing seal includes a plurality of rings mounted between the inner shaft and the outer housing at the lower end portion of the seal chamber 286 as previously indicated. The packing seal comprises at least one pair of ultra-high pressure annular sealing rings 290, which may have a variety of different cross-sectional shapes and/or be formed of a variety of different resilient sealing materials. In a preferred embodiment, the seal rings 290 are chevron-shaped in transverse cross-section and are formed in a precision molding operation from a compound of buna-N, duck and "Nylon" resin. The number of seal rings 290 may also vary depending upon a particular application and pressures that are required. For example, at lower pressures (up to 60,000 psi) and high rpm (up to 250 rpm), two seal rings can be used to provide for minimum friction of the seal rings on the rotating shaft whereas, at higher pressures (up to 100,000 psi), three or four rings are used depending upon the selected rpm and the desired high pressure range.

The sealing rings 290 are sandwiched between the upper and lower retaining rings 292 and 294, and in a preferred embodiment, these retaining rings are made of an aluminum-bronze alloy, with a 0.010 inch polyphenylene sulfide coating on the inside diameter to maintain a close to zero clearance between the retaining rings and the surface of the rotating shaft 278. The coil spring 296 which is positioned between the upper retaining ring 292 and the bushing 298 provides a selected value of axially directed thrust to force the upper retaining ring downwardly to provide the desired amount of compression of the inner lips of the seal rings 290 against the surface of the rotating shaft 278. The bushing 298 is held downwardly against the upper end of the body 276 by the upper end cap 300 to compress the coil spring 296 by the engagement of the lower extension 310 against the upper coil of the spring. If necessary, annular shims may be inserted for compressing the spring to greater degree of compression. The coil spring 296 is preferably formed of stainless steel, and is normally compressed to exert a force of at least 30 pounds against the upper retaining ring 292 which has an undersurface that is V-shaped to match the upper face of the upper seal ring 290. The V-shaped surface spreads the thrust force of the coil spring and urges the tapered lips of the sealing rings into close, tight sealing contact with the wall of the seal chamber 286 and with the surface of the inner rotating shaft 278. The upper surface of the metallic, lower retaining ring 294 has a matching V-shaped groove to match the surface of the lower sealing ring 290.

As previously disclosed, a portion of the seal chamber between the upper retaining ring 292 and the bushing 298 is filled with a specially formulated liquid lubricant 288 in order to continuously lubricate the rotating shaft 278 in the region where the shaft passes through the packing rings 290,292 and 294. The liquid lubricant is introduced into the seal chamber 286 through a one way, pressure-tight, grease fitting 323. In a preferred embodiment, the lubricant comprises a visco-elastic material, which by reason of its physical properties tends to rise or climb along the surface of the centrally positioned rotating shaft during rotation, thus providing an increased depth of lubricant adjacent the outer surface of the shaft. Because of the visco-elastic property of the lubricant 288, a small amount will tend to lubricate and seal the surface of the shaft in the region where the shaft passes through the inner bore of the sealing rings. Accordingly, the visco-elastic type lubricant does not need to be replenished or refilled as often as with other types of oils and greases.

As previously indicated, the annular bushing 298 is provided with a plurality of passageways 302 for allowing direct communication between the ultra-high pressure working fluid in the passage 306 and the seal chamber 286 so that during normal operation, the space above the visco-elastic lubricant 288 will be filled with the ultra-high pressure working fluid and the seal chamber pressure will be equalized with that of the ultra-high pressure working fluid being used.

As illustrated in FIG. 3, assembly of the high pressure swivel 260 of the present invention is easy and straightforward. To provide a high pressure seal during normal operation, an O-ring 324 is mounted between the upper surface of the bushing 298 and the lower extension 310 of the upper end cap 300. The lower end cap 312 is also provided with an elastomeric sealing ring 327 which is held in compressive engagement with the surface of the sleeve 314 by an embedded spring wire 326. The sealing ring is captured within an annular seal slot 328 closed by an outside sealing plate 330.

The lower end cap 312 is threadedly engaged with a threaded section on the lower end portion of the outer housing 276 and as a safeguard against inadvertent loosening, the lower end cap is provided with set screws 332. An atmospheric vent 334 is provided in the outer housing 276 to communicate between the ambient outside atmosphere and an inside area within the aperture 325 around the rotating shaft 278.

The new and improved swivel of the present invention thus permits relatively fast rotation between sequential portions of an ultra-high pressure working fluid line so that a cutting nozzle 84 having a plurality of nozzle inserts 120 with angularly divergent outlet orifices can be rotated to provide a wider path or area of cutting in a workpiece than available with a single, thin, high velocity cutting jet stream.

Referring now to FIG. 3A, therein is illustrated another embodiment of a swivel constructed in accordance with the features of the present invention and referred to by the reference number 260A. The swivel 260A is generally similar in operation and structure to the swivel 260 as previously described and like reference numbers are used for similar components thereof. However, components of the swivel 260A which are significantly different from those counterparts of the prior embodiment will be designated with the same reference numeral with an additional suffix "A".

The Swivel 260A has a modified housing or outer member 276A for accommodating a modified hollow swivel shaft or rotative inner member 278A which is formed with an integral, radial flange 280A spaced below the aperture 325 between the seal chamber 286 and an inwardly extending bearing compartment 277 formed in the lower end of the housing. Within the chamber 277, there is provided a pair of opposed tapered roller bearing, thrust bearing ring assemblies 282A and 284A designed to handle axial thrust loads in both directions between the rotating shaft and the housing or outer member.

Each bearing ring assembly includes an outer race 322A and an inner race 320A and the outer races are spaced apart by an annular spacing ring 321. An upper end surface of the outer race 322A of the upper bearing ring 282A is seated against a shoulder 277a provided in the wall of the bearing chamber 277 and the lower end surface of the outer race 322A of the lower bearing ring 284A is seated against the upper surface of a modified end plate 312A. The end plate is secured to the lower end of the housing 276A with cap screws 332A and closes the chamber 277 around the rotating shaft 278A.

The inner bearing race 320A of the upper bearing ring assembly 282A has an upper end face which bears against the lower annular, radial face on the flange 280A of the hollow rotating shaft 278A and the inner bearing race of the lower bearing ring assembly 284A has a lower face seated against an annular shoulder 329 provided in the upper surface of the closure plate 312A. The plate is also provided with another annular shoulder surface 328A for accommodating a sealing ring 327A around the rotating shaft.

From the foregoing, it is clear that the lower end portion of the modified swivel 260A has somewhat fewer component parts and is somewhat simpler in construction than the swivel 260. In addition, the pair of opposed, thrust bearing ring assemblies 282A and 284A provide support for resisting axial displacement between the rotating shaft 278A and the housing 276A in both directions should such a tendency be encountered during operation. The high pressure packing rings and sealing action in the chamber 286 is the same in both embodiments of the swivels 260 and 260A.

Although the present invention has been described in terms of a preferred embodiment, it is intended to include those equivalent structures, some of which may be apparent upon reading this description, and others that may be obvious after study and review.

What is claimed and sought to be secured by Letters Patent of the United States is:

1. An ultra-high presure liquid pump comprising:
   an odd numbered plurality of low pressure liquid cylinders disposed radially outwardly of the axis of rotation of an eccentric crankshaft, said low pressure cylinders having longitudinal axes spaced equilaterally around said crankshaft axis in a common radial plane;
   a low pressure piston mounted for reciprocation between an inner end and an outer end of each of said low pressure cylinders and means interconnecting each low pressure piston and said crankshaft to reciprocate said low pressure piston back and forth in a respective low pressure cylinder on successive pressure and exhaust strokes for each revolution of said crankshaft;
   a high pressure cylinder longitudinally aligned with and adjacent the outer end of each low pressure cylinder having a high pressure piston reciprocally mounted therein and interconnected to reciprocate with the lower pressure piston in the adjacent low pressure cylinder;
   high pressure valve means for each high pressure cylinder including an inlet check valve for introducing working liquid into said high pressure cylinder upon an intake stroke of said low pressure piston and an outlet check valve for expelling said working liquid under high pressure from said high pressure cylinder upon an exhaust stroke of said low pressure piston;
   a high pressure manifold interconnecting the outlet check valves of each high pressure cylinder for providing a supply of high pressure working liquid; and
   means for rotating said crankshaft about said axis to pressurize said working liquid in said manifold;
   cylinder head means at the outer end of each of said low pressure cylinders formed with a central passage therein in communication with a respective high pressure cylinder secured thereto;
   said high pressure piston in said respective high pressure cylinders extending through said passage and directly connected to the low pressure piston in a respective low pressure cylinder for reciprocal movement therewith; and
   high pressure annular seal means around each of said high pressure pistons for sealing between each pair of coaxially alinged, high and low pressure cylinders, each said seal means comprising a plurality of annular sealing rings around each of said high pressure pistons mounted in a sealing chamber formed at an inner end of each high pressure cylinder;
   each of said seal chambers including a portion formed in the cylinder head means of the adjacent low pressure cylinder around the central passage thereof.

2. The ultra-high pressure liquid pump of claim 1 wherein said crankshaft is adapted to be coupled to a rotary external power source at one end.

3. The ultra-high pressure liquid pump of claim 1 including a hydraulic system for rotating said crankshaft, comprising:
   a valve body formed with a fixed inlet port for supplying pressurized hydraulic liquid to said low pressure cylinders and a fixed outlet port for receiving returning hydraulic liquid from said low pressure cylinders;
   a distributor valve rotatable with said crankshaft and including an inlet in communication with said fixed inlet port having a rotating outlet recess for distributing said pressured liquid to successive low pressure cylinders around said crank shaft to rotate the same;
   a hydraulic liquid passage for each of said low pressure cylinders having one end for connection between said rotating outlet and an opposite end in communication with said cylinder;
   and a rotating inlet recess on said distributor valve in communication between said one end of successive liquid passages and said fixed outlet port for returning said hydraulic liquid from said low pressure fluid cylinders in sequence as said crankshaft rotates.

4. The ultra-high pressure liquid pump of claim 3 said rotatable distributor valve is coupled with one end of said crankshaft;
   and wherein said crankshaft includes an opposite end adapted to be coupled to a rotary external power source.

5. The ultra-high pressure liquid pump of claim 1 wherein:
   said crankshaft includes an eccentric of generally cylindrical shape movable toward and away from the inner end of each of said low pressure liquid cylinders as said crankshaft rotates,
   said means for interconnecting each of said low pressure pistons and said crankshaft comprising a connecting rod having a shoe at the inner end with a curved shoe surface bearing against said cylindrical eccentric, and ball and socket joint means interconnecting an outer end of said rod and associated low pressure piston; and
   annular retaining ring means around said cylindrical eccentric for securing said shoes against the surface of said eccentric during rotation thereof.

6. The ultra-high pressure liquid pump of claim 1, wherein said plurality of seal rings around each of said high pressure pistons comprises:
   a plurality of annular support seal rings formed of a mixture of low friction plastic material and graphite;
   a pair of back-up annular seal rings bearing against opposite faces of said support rings, and
   an annular wave spring engaging an annular outer face of one of said back-up seal rings for exerting compression force between engaging annular faces of adjacent seal rings.

7. The ultra-high pressure liquid pump of claim 6, wherein;
   at least one of said annular seal rings includes an annular end face comprising at least one frustoconical surface sloping angularly outwardly of the adjacent high pressure piston.

8. The ultra-high pressure liquid pump of claim 7, wherein;
   said one annular seal ring includes an opposite annular end face having at least one frustoconical surface sloping angularly outwardly of the adjacent high pressure piston.

9. The ultra-high pressure liquid pump of claim 7, wherein;
   said one annular seal ring includes a second frustoconical surface around said one frustoconical surface angularly disposed in an opposite sloping direction relative thereto.

10. The ultra-high pressure liquid pump of claim 1, wherein;

said inlet check valves are mounted in an outer end wall of said high pressure cylinders in coaxial alignment with said high pessure pistons, and including a working liquid supply conduit for interconnecting said inlet check valves.

11. The ultra-high pressure liquid pump of claim 10, wherein;

said outlet check valves are mounted in a sidewall portion of said high pressure cylinder adjacent an outer end thereof; and wherein said manifold includes a collecting chamber adjacent said crankshaft and a plurality of high pressure conduits for supplying high pressure working liquid from said respective outlet check valves to said collecting chamber.

12. The ultra-high pressure liquid pump of claim 11, wherein;

said outlet check valves are aligned to direct a flow of high pressure working liquid radially outwardly of the respective longitudinal axes of said high pressure cylinders.

13. An ultra-high pressure liquid pump comprising:

a body having an odd numbered plurality of low pressure hydraulic liquid cylinders disposed radially outwardly of the axis of rotation of an eccentric crankshaft, said low pressure cylinders having longitudinal axes spaced equilaterally around said crankshaft axis in a common radial plane;

a low pressure piston mounted for reciprocation between an inner end and an outer end of each of said low pressure cylinders and means interconnecting each low pressure piston and said crankshaft to reciprocate said low pressure piston back and forth in a respective low pressure cylinder on successive pressure and exhaust strokes for each revolution of said crankshaft;

a high pressure cylinder coaxially aligned with and adjacent the outer end of each low pressure cylinder having a high pressure piston reciprocally mounted therein and interconnected to reciprocate with the lower pressure piston in the adjacent low pressure cylinder;

high pressure valve means for each high pressure cylinder including an inlet check valve for introducing working liquid into said high pressure cylinder upon an intake stroke of said low pressure piston and an outlet check valve for expelling said working liquid under high pressure from said high pressure cylinder upon an exhaust stroke of said low pressure piston;

a high pressure manifold interconnecting the outlet check valves of each high pressure cylinder for providing a supply of high pressure working liquid;

means for rotating said crankshaft about said axis to pressurize said working liquid in said manifold;

said rotating means including first means comprising a valve body formed with a fixed inlet port for supplying pressurized hydraulic liquid to said low pressure cylinders and a fixed outlet port for receiving returning hydraulic liquid from said low pressure cylinders;

a distributor valve rotatable with and coupled to one end of said crankshaft and including an inlet in communication with said fixed inlet port having a rotating outlet recess for distributing said pressurized hydraulic liquid to successive low pressure cylinders around said crankshaft to rotate the same;

a hydraulic liquid passage for each of said low pressure cylinders having one end for connection between said rotating outlet and an opposite end in communication with said cylinder;

a rotating inlet recess on said distributor valve in communication between said one end of successive hydraulic liquid passages and said fixed outlet port for returning said hydraulic liquid from said low pressure cylinders in sequence as said crankshaft rotates;

cylinder head means at the outer end of each of said low pressure cylinders formed with a central passage therein in communication with a respective high pressure cylinder secured thereto;

said high pressure pistons in said respective high pressure cylinders extending through said passage and directly connected to the low pressure piston in a respective low pressure cylinder for reciprocal movement therewith;

high pressure annular seal means around each of said high pressure pistons for sealing between each pair of coaxially aligned, high and low pressure cylinders, each of said seal chambers including a portion formed in the cylinder head means of the adjacent low pressure cylinder around the central passage thereof;

said seal means around each of said high pressure pistons comprising a plurality of annular support seal rings formed of a mixture of low friction plastic material and graphite, a pair of back-up annular seal rings bearing against opposite faces of said support rings, and an annular wave spring engaging an annular outer face of one of said back-up seal rings for exerting compression force between engaging annular faces of adjacent seal rings; and said rotating means including second means comprising an opposite end of said crankshaft extending outwardly of said body having means thereon adapted to be coupled to a rotary external power source as an alternate means for rotating said crankshaft to generate ultra-high pressure working liquid in said high pressure cylinders.

14. The ultra-high pressure pump of claim 13, wherein;

said seal means comprises a plurality of annular sealing rings around each of said high pressure pistons mounted in a sealing chamber formed at an inner end of each high pressure cylinder.

15. The ultra-high pressure pump of claim 13, wherein;

at least one of said annular seal rings includes an annular end face comprising at least one frustoconical surface sloping angularly outwardly of the adjacent high pressure piston.

16. The ultra-high pressure pump of claim 15, wherein;

said one annular seal ring includes an opposite annular end face having at least one frustoconical surface sloping angularly outwardly of the adjacent high pressure piston.

17. The ultra-high pressure pump of claim 15, wherein;

said one annular seal ring includes a second frustoconical surface around said one frustoconical surface angularly disposed in an opposite sloping direction relative thereto.

18. The ultra-high pressure pump of claim 15, wherein;
 said inlet check valves are mounted in an outer end wall of said high pressure cylinders in coaxial alignment with said high pressure pistons, and including
 a working liquid supply conduit for interconnecting said inlet check valves.

19. The ultra-high pressure pump of claim 18, wherein;
 said outlet check valves are mounted in a sidewall portion of said high pressure cylinder adjacent an outer end thereof; and wherein
 said manifold includes a collecting chamber adjacent said crankshaft and a plurality of high pressure conduits for supplying high pressure working liquid from said respective outlet check valves to said collecting chamber.

20. The ultra-high pressure pump of claim 19, wherein;
 said outlet check valves are aligned to direct a flow of high pressure working liquid radially outwardly of the respective longitudinal axes of said high pressure cylinders.

21. The ultra-high pressure pump of claim 13 wherein:
 said crankshaft includes an eccentric of generally cylindrical shape movable toward and away from the inner end of each of said low pressure cylinders as said crankshaft rotates,
 said means for interconnecting each of said low pressure pistons and said crankshaft comprising a connecting rod having a shoe at the inner end with a curved shoe surface bearing against said cylindrical eccentric, and ball and socket joint means interconnecting an outer end of said rod and associated low pressure piston; and
 annular retaining ring means around said cylindrical eccentric for securing said shoes against the surface of said eccentric during rotation thereof.

* * * * *